US008467075B2

(12) United States Patent
Takashima

(10) Patent No.: US 8,467,075 B2
(45) Date of Patent: Jun. 18, 2013

(54) PRINTING CONTROL APPARATUS USING A PRINT SETTING, METHOD AND MEDIUM

(75) Inventor: Keiichi Takashima, Kawasaki (JP)

(73) Assignee: Canon Kabushiki Kaisha (JP)

(*) Notice: Subject to any disclaimer, the term of this patent is extended or adjusted under 35 U.S.C. 154(b) by 627 days.

(21) Appl. No.: 12/264,756

(22) Filed: Nov. 4, 2008

(65) Prior Publication Data

US 2009/0116063 A1     May 7, 2009

(30) Foreign Application Priority Data

Nov. 5, 2007    (JP) ................. 2007-287854

(51) Int. Cl.
*G06K 15/00*    (2006.01)
*G06K 15/02*    (2006.01)

(52) U.S. Cl.
USPC .......................... 358/1.13; 358/1.9

(58) Field of Classification Search
None
See application file for complete search history.

(56) References Cited

U.S. PATENT DOCUMENTS

| | | | | |
|---|---|---|---|---|
| 7,821,667 | B2* | 10/2010 | Bahl et al. | 358/1.18 |
| 2005/0094200 | A1* | 5/2005 | Uekusa et al. | 358/1.15 |
| 2005/0105146 | A1* | 5/2005 | Tanaka | 358/498 |
| 2005/0141008 | A1* | 6/2005 | Billow et al. | 358/1.13 |
| 2006/0028664 | A1* | 2/2006 | Ono | 358/1.9 |
| 2006/0146353 | A1* | 7/2006 | Yue et al. | 358/1.13 |
| 2007/0070377 | A1 | 3/2007 | Hirabayashi | |
| 2007/0216925 | A1* | 9/2007 | Nakamura | 358/1.13 |
| 2008/0037049 | A1* | 2/2008 | Bahl et al. | 358/1.13 |
| 2008/0079977 | A1* | 4/2008 | van de Capelle et al. | 358/1.13 |
| 2008/0170246 | A1* | 7/2008 | Patton et al. | 358/1.9 |
| 2009/0086255 | A1* | 4/2009 | Duong | 358/1.15 |
| 2009/0091781 | A1* | 4/2009 | Nishimura | 358/1.15 |

FOREIGN PATENT DOCUMENTS

| | | |
|---|---|---|
| JP | 2002182873 A | 6/2002 |
| JP | 2006-53860 A | 2/2006 |
| JP | 2006285900 A | 10/2006 |
| JP | 2007034534 A | 2/2007 |
| JP | 2007-083725 A | 4/2007 |

OTHER PUBLICATIONS

XML Paper Specification, XPS Specification and Reference Guide, © 2006 Microsoft Corporation, Version 1.0.*
JP OA issued Dec. 17, 2012 for corres. JP 2007-287854.

* cited by examiner

*Primary Examiner* — Barbara Reinier
(74) *Attorney, Agent, or Firm* — Rossi, Kimms & McDowell LLP

(57) ABSTRACT

Disclosed is a printing control apparatus for acquiring print data having attribute information stored by an application, and creating output data, which is output to a printer, using the print data acquired. The apparatus includes an acquisition unit configured to refer to the attribute information included in the print data and acquiring settings information, which satisfies a condition, from at least one item of settings information that has been stored previously in a storage area; a generating unit configured to generate final print settings by superimposing print settings, which have been set in the settings information acquired by the acquisition unit and satisfying the condition, on print settings that have been set in a printer driver; and a creating unit configured to create output data in accordance with the final print settings generated by the generating unit.

7 Claims, 13 Drawing Sheets

F I G. 5
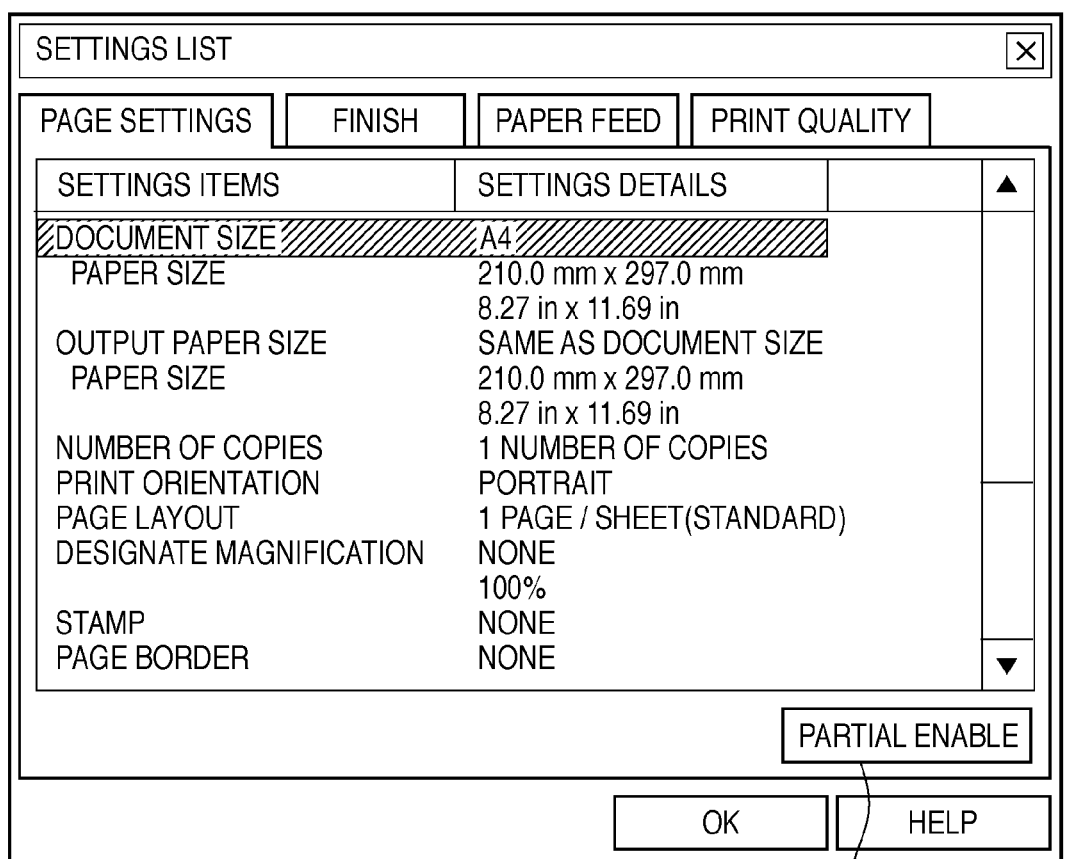

FIG. 6

| ORDER OF PRIORITY | PROFILE NAME | APPLICATION CONDITIONS (ATTRIBUTES OF XPS DATA) | PRINT SETTINGS |
|---|---|---|---|
| 1 | BOX STORAGE | category = "PRINTING HISTORY" AND contentStatus = "secret" | BOX STORAGE |
| 2 | WATERMARK ADDED | category = "PRINTING HISTORY" AND contentStatus = "protected" | WATERMARK PRINT ON |
| 3 | DRAFT | revision = "draft" | MONOCHROME ; CONSERVE BLANK PAPER ON |
| 4 | COMPLETED VERSION | revision = "final" | COLOR ; CONSERVE BLANK PAPER OFF ; WATERMARK ON |

FIG. 12

| PROPERTIES | DESCRIPTION |
|---|---|
| category | CATEGORY OF CONTENT |
| contentStatus | STATUS OF CONTENT |
| contentType | TYPE OF CONTENT |
| created | CREATION DATE AND TIME |
| description | TYPES OF TEXT AND GRAPHICS, ETC. |
| identifier | IDENTIFIER |
| keywords | KEYWORD |
| language | LANGUAGE |
| lastModifiedBy | LAST PERSON TO MAKE MODIFICATION |
| lastPrinted | LAST DATE AND TIME OF PRINTING |
| modified | LAST DATA AND TIME OF EDITING |
| revision | REVISION |
| subject | SUBJECT OF CONTENT |
| title | NAME OF PACKAGE |
| version | VERSION |

PRINTING CONTROL APPARATUS USING A PRINT SETTING, METHOD AND MEDIUM

BACKGROUND OF THE INVENTION

1. Field of the Invention

The present invention relates to a printing control apparatus in which print settings can be changed over automatically.

2. Description of the Related Art

When it is desired to print a plurality of documents using different print settings, the conventional practice is to open an application and a dialog screen, which is for setting a printer driver, change the settings and then print, one document at a time. However, this operation is extremely troublesome in cases where documents are large in quantity. Moreover, since operation by the user is required, it is difficult to automate the procedure. The specification of Japanese Patent Application Laid-Open No. 2006-53860 discloses a printing control apparatus in which the user can readily select from previously stored print settings in accordance with the attributes or state of the document to be printed. Alternatively, the apparatus allows the selection to be performed automatically.

The XPS (XML Paper Specification) printing system, which is included with the Windows (registered trademark) Vista operating system, has come into widespread use in recent years. XPS data, which is print data received by the printer driver in this system, contains public attributes referred to as "core properties". By using the core properties, the printing application can store information in the print data and the stored information can be utilized in the printer driver. Thus, configurations that are difficult to achieve in a conventional GDI (Graphic Device Interface) printing system become possible with the XPS printing system.

FIG. 13 is a diagram useful in describing the concept of configuring document data. A document illustrated in FIG. 13 contains print settings and core properties. There are also instances where a digital signature is added to the document. In order to change the print settings, it is necessary to comprehend the document format and to unlock the digital signature. Generally, therefore, making the change is difficult. On the other hand, the core properties can be changed easily even in cases where the document format is not known. Accordingly, if control can be exercised so as to change some of the print settings of the printer driver at the time of printing by changing the core properties, then user friendliness can be enhanced.

With the printing control apparatus disclosed in Japanese Patent Application Laid-Open No. 2006-53860, it is necessary to acquire the attributes of a print document by accessing a document file or document management server from within the printing program. To achieve this, therefore, the full-path name of the document file or access account information, etc., is required to be delivered to the printing program. However, there is the danger that such an arrangement will lead to security-related problems. Further, since such information cannot be delivered to the printer driver in a public interface, it is difficult to implement the technique of Japanese Patent Application Laid-Open No. 2006-53860 in a printer driver. Furthermore, in a case where printing is carried out from within an application that designates the print settings, it so happens that the settings are changed over to the print settings that have been selected by the user or that have been selected automatically. A problem which arises is that the designations made by the application are lost.

SUMMARY OF THE INVENTION

The present invention provides a printing control apparatus in which automatic changeover of print settings can be implemented in the printer driver.

According to a first aspect of the present invention, there is provided a printing control apparatus for acquiring print data having attribute information stored by an application, and creating output data, which is output to a printer, using the print data acquired, the apparatus comprising: an acquisition unit configured to refer to the attribute information included in the print data and acquire settings information, which satisfies a condition, from at least one item of settings information that has been stored previously in a storage area; a generating unit configured to generate final print settings by superimposing print settings, which have been set in the settings information acquired by the acquisition unit and satisfying the condition, on print settings that have been set in a printer driver; and a creating unit configured to create output data in accordance with the final print settings generated by the generating unit.

According to a second aspect of the present invention, there is provided a method of controlling a printing control apparatus for acquiring print data having attribute information stored by an application, and creating output data, which is output to a printer, using the print data acquired, the apparatus comprising: an acquisition step of referring to the attribute information included in the print data and acquiring settings information, which satisfies a condition, from at least one item of settings information that has been stored previously in a storage area; a generating step of generating final print settings by superimposing print settings, which have been set in the settings information acquired at the acquisition step and satisfying the condition, on print settings that have been set in a printer driver; and a creating step of creating output data in accordance with the final print settings generated at the generating step.

According to a third aspect of the present invention, there is provided a computer-readable storage medium storing a printing control program, which is executed by a computer, for acquiring print data having attribute information stored by an application, and creating output data, which is output to a printer, using the print data acquired, the program causing the computer to function so as to: refer to the attribute information contained in the print data and acquire settings information, which satisfies a condition, from at least one item of settings information that has been stored previously in a storage area; generate final print settings by superimposing print settings, which have been set in the acquired settings information satisfying the condition, on print settings that have been set in a printer driver; and create output data in accordance with the final print settings generated.

In accordance with the present invention, automatic changeover of print settings can be implemented in a printer driver.

Further features of the present invention will become apparent from the following description of exemplary embodiments with reference to the attached drawings.

BRIEF DESCRIPTION OF THE DRAWINGS

FIG. 5 is a diagram illustrating an example of a settings list screen in this embodiment;

FIG. 6 is a diagram illustrating an example of profiles stored previously;

FIG. 12 is a diagram illustrating a list of core properties of XPS data; and

DESCRIPTION OF THE EMBODIMENTS

Figure 1:
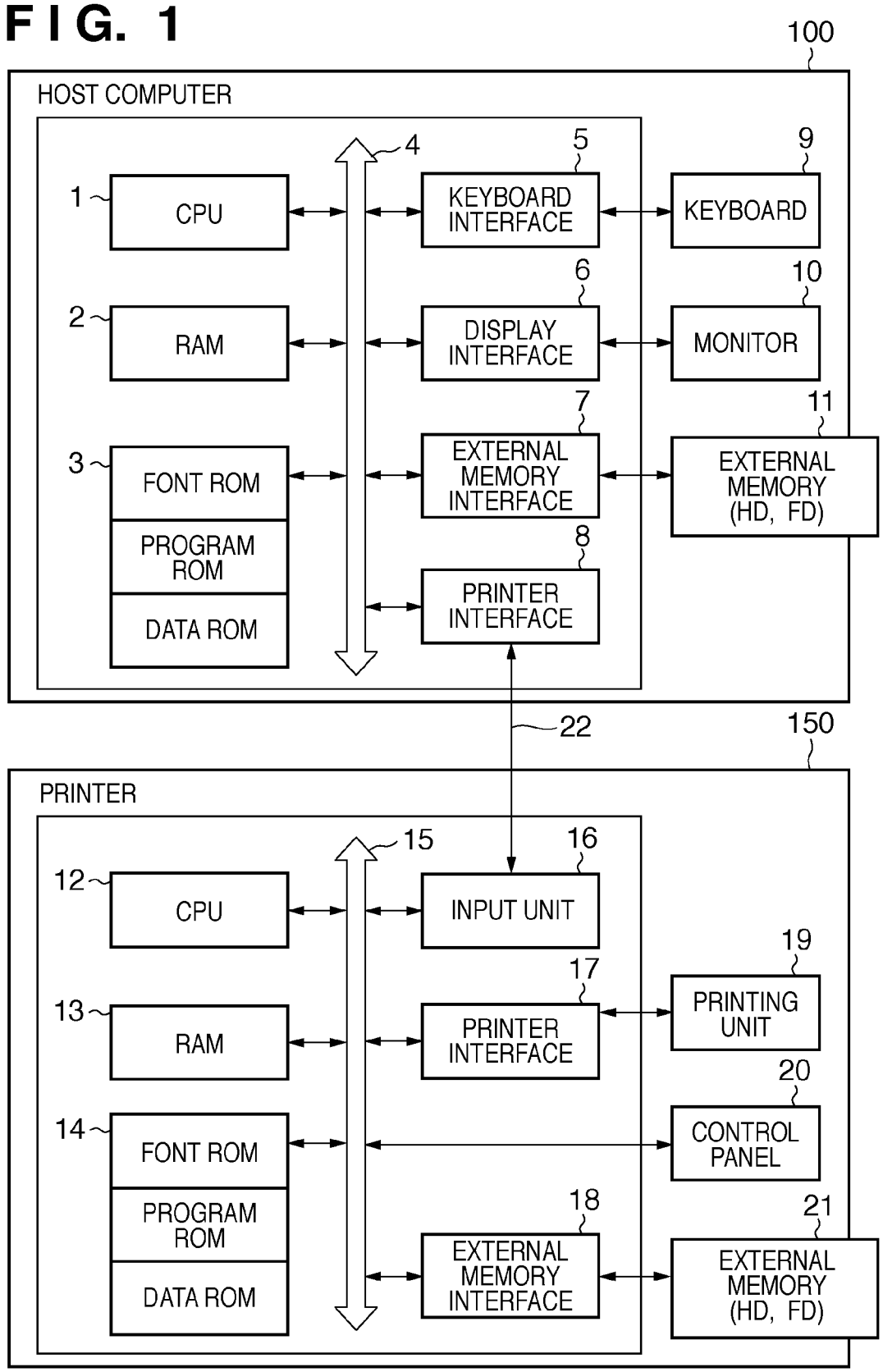
FIG. 1 is a diagram illustrating the configuration of a printing system according to a first embodiment of the present invention.

Preferred embodiments of the present invention will now be described in detail with reference to the drawings. It should be noted that identical structural elements are designated by like reference characters and will be described only once.

FIG. 1 is a diagram illustrating the configuration of a printing control apparatus in which print settings best suited for a document can be changed over automatically. This printing control apparatus is used in an XPS printing system newly included in the Windows (Registered Trademark) Vista operating system. In this embodiment, core properties can be changed in a printer driver at the time of printing and, as a result, control can be exercised so as to perform printing upon changing some of the print settings.

The system shown in FIG. 1 includes a host computer 100 having a CPU 1 which, on the basis of a word processing program that has been stored in a program ROM of a ROM 3 or in an external memory 11, executes the word processing of a document containing mixed objects such as graphics, images, text and tables (inclusive of spreadsheets, etc.). Further, the CPU 1 performs overall control of various devices connected to a system bus 4. The program ROM of the ROM 3 or the external memory 11 stores an operating system, etc., which is the control program of the CPU 1. A font ROM of the ROM 3 or the external memory 11 stores font data, etc., used when the above-mentioned word processing is executed. Further, various data used when the above-mentioned word processing is executed is stored in the font ROM of the ROM 3 or in the external memory 11. A RAM 2 functions as the main memory and work area, etc., of the CPU 1. A keyboard interface 5 controls key inputs from a keyboard 9 and pointing device, which is not shown. A display interface 6 controls the display on a monitor 10. An external memory interface 7 controls access to the external memory 11, which stores a booting program, various applications, font data, user files, edited files and a printer driver, etc. By way of example, a hard disk or a floppy (registered trademark) disk may be used as the external memory 11. A printer interface 8, which is connected to a printer 150 via a prescribed bidirectional interface 22, executes processing for controlling communication with the printer 150. It should be noted that the CPU 1 executes processing for rasterizing outline fonts in a display-information RAM that has been set up in RAM 2 and implements a WYSIWYG (What You See Is What You Get) display on the monitor 10. Further, on the basis of commands designated by a mouse cursor (not shown) on the monitor 10, the CPU 1 opens various windows that have been registered and executes a variety of data processing. When printing is executed, the user opens a window relating to print settings and can set the printer and set a printing processing method in regard to the printer driver, the setting including the selection of a printing mode.

As illustrated in FIG. 1, the printer 150 has a printer CPU 12 which, on the basis of a control program stored in a program ROM of a ROM 14 or a control program stored in an external memory 21, outputs an image signal, which serves as output information, to a printing unit (printer engine) 19 connected via a printer interface 17 connected to a system bus 15. A control program of the CPU 12 is stored in the program ROM of the ROM 14. Font data, etc., used when the above-mentioned output information is generated is stored in a font ROM of the ROM 14. In case of a printer not equipped with the external memory 21 such as a hard disk, information utilized in the host computer is stored in a data ROM of the ROM 14. The CPU 12, which can execute processing for communicating with the host computer via an input unit 16, is capable of notifying the host computer 100 of information internal to the printer. It should be noted that the RAM 13 functions as a main memory and work area, etc., of the CPU 12 or the like and is so adapted that memory capacity can be expanded by optional RAM connected to an expansion port, not shown. The RAM 13 is used as an area for developing output information, as an area for storing environment data and as an NVRAM (non-volatile RAM). The external memory 21, such a hard disk or IC card, has its access controlled by an external memory interface 18. The external memory 21, which is connected to the printer as an option, stores font data, an emulation program and form data, etc. Further, a control panel 20 has an array of switches and LED indicators for operating the printer. An arrangement may be adopted in which a plurality of optional font cards storing optional fonts to supplement the internal fonts or a plurality of external memories storing programs for interpreting printer control languages of different language systems can be connected to the apparatus. Furthermore, the external memory may have an NVRAM (not shown) for storing printer mode settings information from the control panel 20. In this embodiment illustrated in FIG. 1, the system may be constituted by a stand-alone device, by a plurality of devices or by making a connection via a network such as a LAN or WAN.

Figure 2:
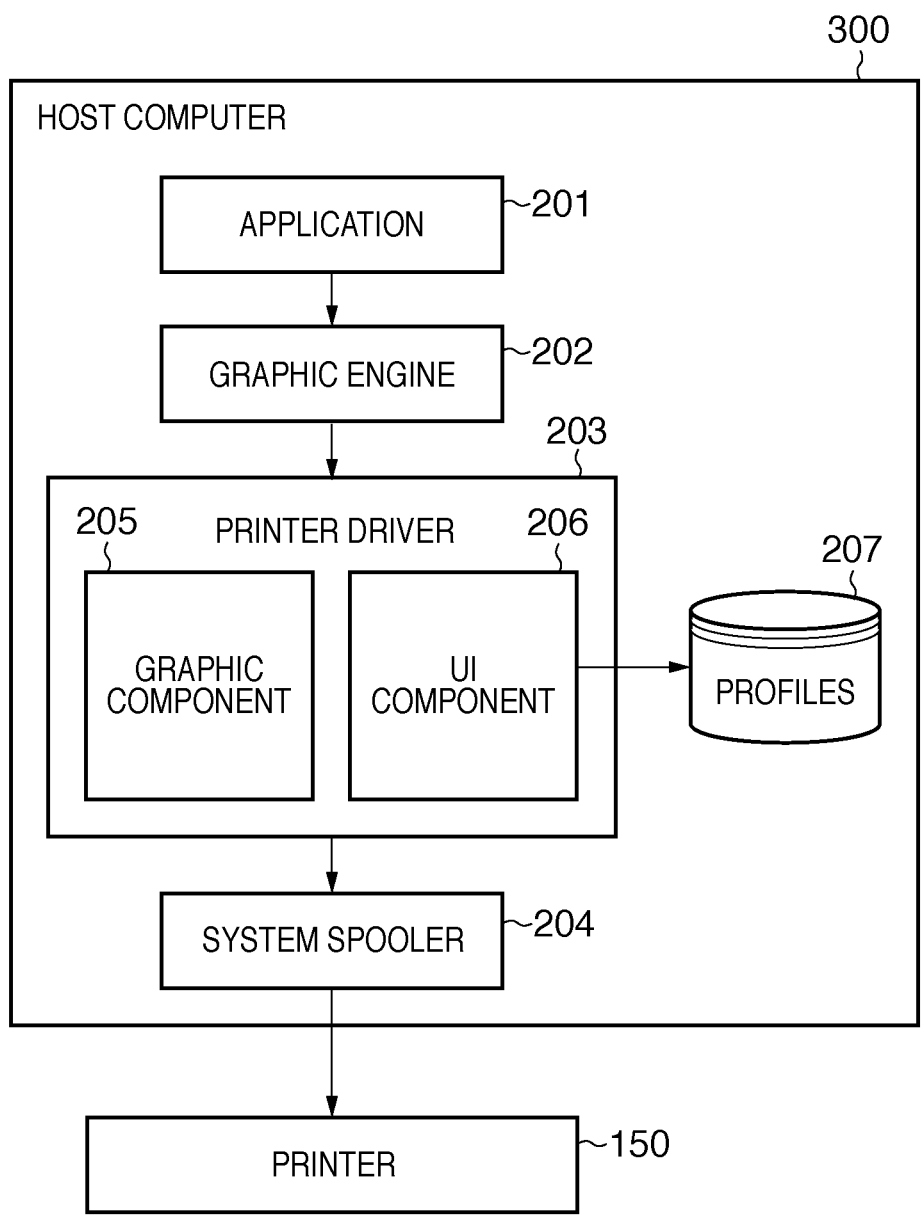
FIG. 2 is a diagram illustrating an example of the configuration of a host computer shown in FIG. 1.

FIG. 2 is a diagram illustrating an example of an arrangement for print processing in the host computer 100 of FIG. 1. An application 201, graphic engine 202, printer driver 203 and system spooler 204 have been stored in the external memory 11 as files. These are program modules executed upon being loaded in the RAM 2 by the operating system or other modules. The application 201 and the printer driver 203 can be added to the floppy (registered trademark) disk or CD-ROM (not shown) of the external memory 11 or to the hard disk of the external memory 11 via a network, not shown.

The application 201, which has been stored in the external memory 11 is executed upon being loaded in the RAM 2. When printing is performed by the printer 150 from within the application 201, output (rendering) is performed utilizing the graphic engine 202 capable of being executed upon being loaded in the RAM 2 in similar fashion. The graphic engine 202 loads the printer driver 203, which is prepared for each printing apparatus such as a printer, from the external memory 11 to the RAM 2 and sets the output from the application 201 in the printer driver 203. The graphic engine 202 accepts print settings or data for printing from the application 201 and outputs the settings or data to the printer driver 203 as print data.

The printer driver 203 has a graphic component 205 for receiving print data from the graphic engine 202 and converting the print data to a printer control command capable of being recognized by the printer. The printer control command is in PDL (Page Description Language), by way of example. The printer control command obtained by the conversion is output to the printer 150 via the system spooler 204 that has been loaded in RAM 2 by the operating system. The printer driver 203 further includes a UI component 206 for receiving print settings from the graphic engine 202, displaying and changing the print settings and then sending the results back to the application through the graphic engine. Further, at least one print setting, which has been stored in advance, has been stored in profiles 207 stored in the external memory 11, and is read by the UI component 206 and can be stored further. In this embodiment, the profile shall be referred to as "settings information".

XPS data used in this embodiment will now be described. In the XPS printing system newly included in Windows (registered trademark) Vista, the printer driver 203 accepts the XPS data as the print data already described. XPS data is in a data format that enables utilization also as document data. XPS data and Office Open XML data is in a data format that is a subset of the OPC (Open Packaging Conventions). Further, it is essential that OPC data include public attribute information (also referred to as "attributes" below) referred to as "core properties". FIG. 12 is a diagram illustrating a list of core properties of XPS data. All of the attributes exist here, although there are also cases where attribute values are unassigned. In a case where OPC-based document data is printed, the core properties of the print data are succeeded by the core properties within the document data. In a case where document data that is not OPC-based is printed, the printing application sets values, which have been obtained from user input or from some kind of information concerning the document, as the core properties of the print data, whereupon these settings are reflected in the print data and delivered to the printer driver. Further, the XPS data contains within it print settings referred to as a "print ticket". DEVMODE, which is a print setting in a GDI printing system, sets all attributes at one time. During the course of a job, DEVMODE is changed over in its entirety as necessary. By contrast, the print ticket, which is a print setting in the XPS printing system, is capable of designating only some printing settings on a per-job, per-document or per-page basis.

Figure 3:
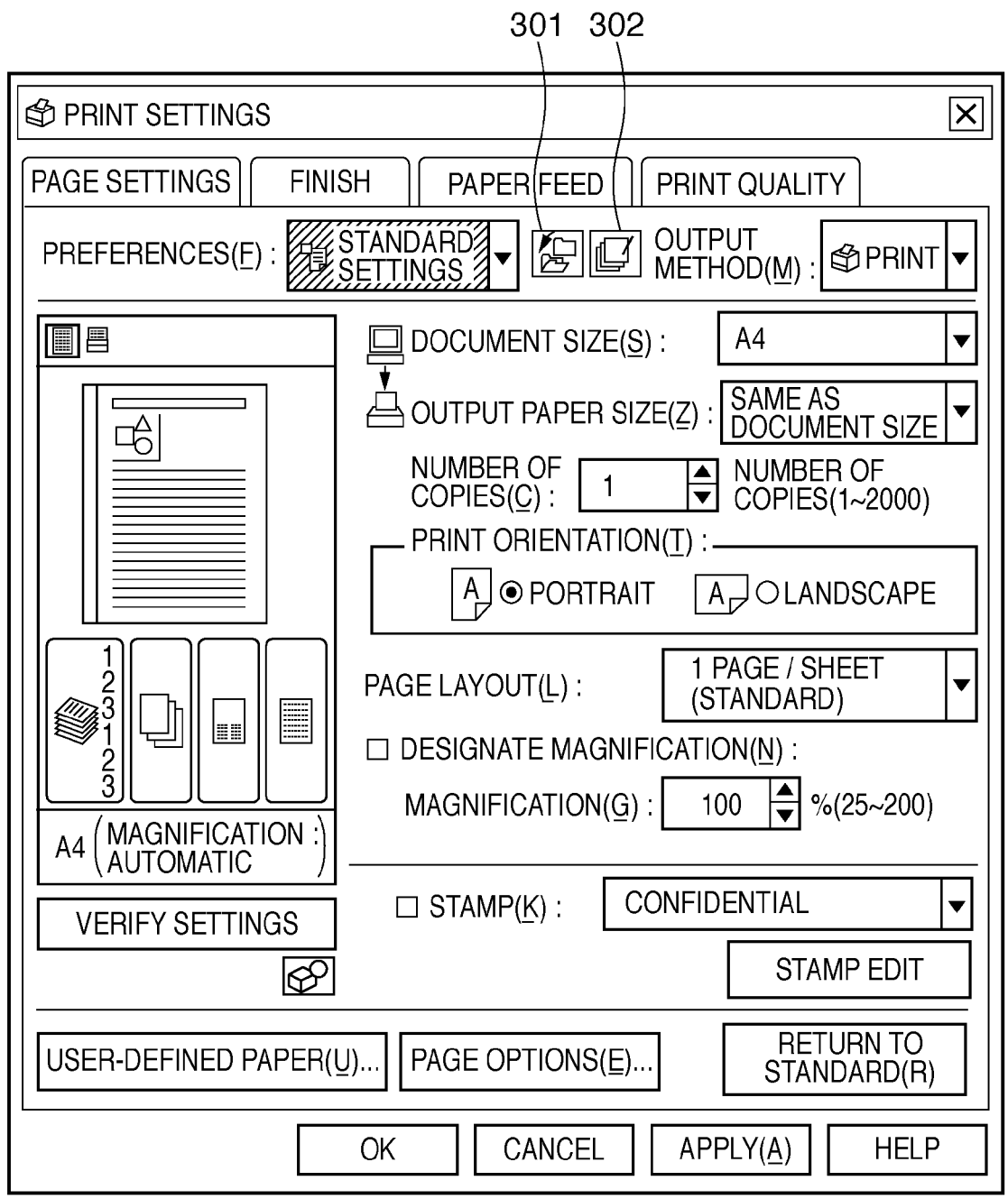
FIG. 3 is a diagram illustrating an example of a print setting screen of a printer driver according to this embodiment.
Figure 4:
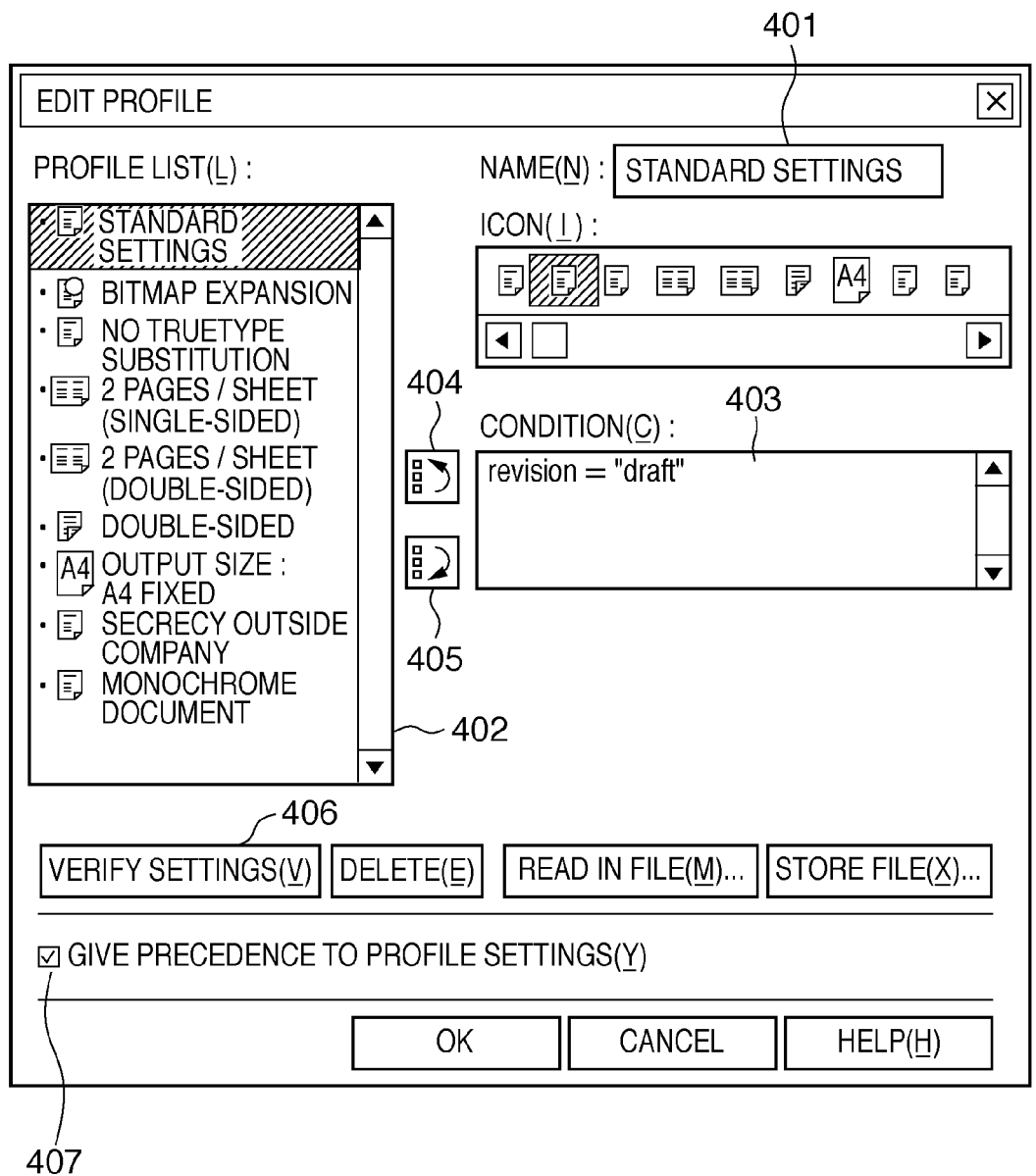
FIG. 4 is a diagram illustrating an example of a screen for editing a profile in this embodiment.

FIG. 3 is a diagram illustrating an example of a print setting screen of the printer driver 203 in this embodiment, FIG. 4 is a diagram illustrating an example of a screen for editing a profile, and FIG. 5 is a diagram illustrating an example of a settings list screen. A plurality of print settings can be stored beforehand in profiles 207 shown in FIG. 2. If a profile add-on button 301 is clicked, a new item is added to a list display area 402 shown in FIG. 4 and the profile editing screen of FIG. 4 is opened in a state in which this item has been selected. If a name different from the others is entered in a name display area 401 and an OK button is clicked, print settings prevailing at the time the profile add-on button 301 is clicked are stored in profiles 207. Furthermore, desired print settings can be selected from the list display area 402 and application conditions used by these settings can be set in a condition display area 403. If a button 404 or 405 is clicked, the priority order in the list display area 402 can be changed to a higher or lower priority. Further, the profile editing screen shown in FIG. 4 can be opened and profile editing performed afterward also by clicking a profile editing button 302.

A condition that uses a core property of print data (XPS data) received by the printer driver 203 can be set in the condition display area 403. For example, a condition "revision='draft'" is set, as illustrated in FIG. 4. Then, if the "revision" attribute of the core properties has been set to the character string "draft", printing can be performed by applying the relevant profile. Furthermore, if a settings verification button 406 is clicked, the settings list screen shown in FIG. 5 opens and detailed print settings of the profile that has been selected in the list display area 402 can be viewed. If one setting item is selected on this screen and a partial enable button 501 is clicked, only this item can be enabled. For example, if paper size is selected and the partial enable button 501 is clicked, the printing attribute that will be changed in the case where this profile is applied will be only the paper size. It may be so arranged that an item that has been partially enabled is displayed in red characters so as to be readily comprehended by the user. Further, it may be so arranged that a plurality of items can be set as items for partial enabling. Further, if a profile priority setting button 407 shown in FIG. 4 is turned on, profile print settings are given precedence in print settings superimposition processing, described later. If the profile priority setting button 407 is turned off, then the print settings included in the print data specified by the application 201 are given precedence. The profile priority setting button 407 is turned on or off with respect to all profiles 207.

FIG. 6 is a diagram illustrating an example of the profiles 207 stored previously using FIGS. 3, 4 and 5. The rows and columns shown in FIG. 6 indicate the profiles (settings information). Four types of profiles are illustrated in FIG. 6. For example, the profile ranked first is a "BOX STORAGE" setting. In a case where this profile is applied, the box storage setting is added to the print settings of the printer driver. Further, the application of this profile depends upon an "APPLICATION CONDITIONS" setting. For example, the printer driver 203 refers to the attributes of received print data. If the result is that the category attribute and content status attribute are "PRINT HISTORY" and "secret", respectively, the profile "BOX STORAGE" is applied. Priority information has been assigned to the four types of profiles shown in FIG. 6. The application conditions are evaluated in the priority order.

Figure 7:
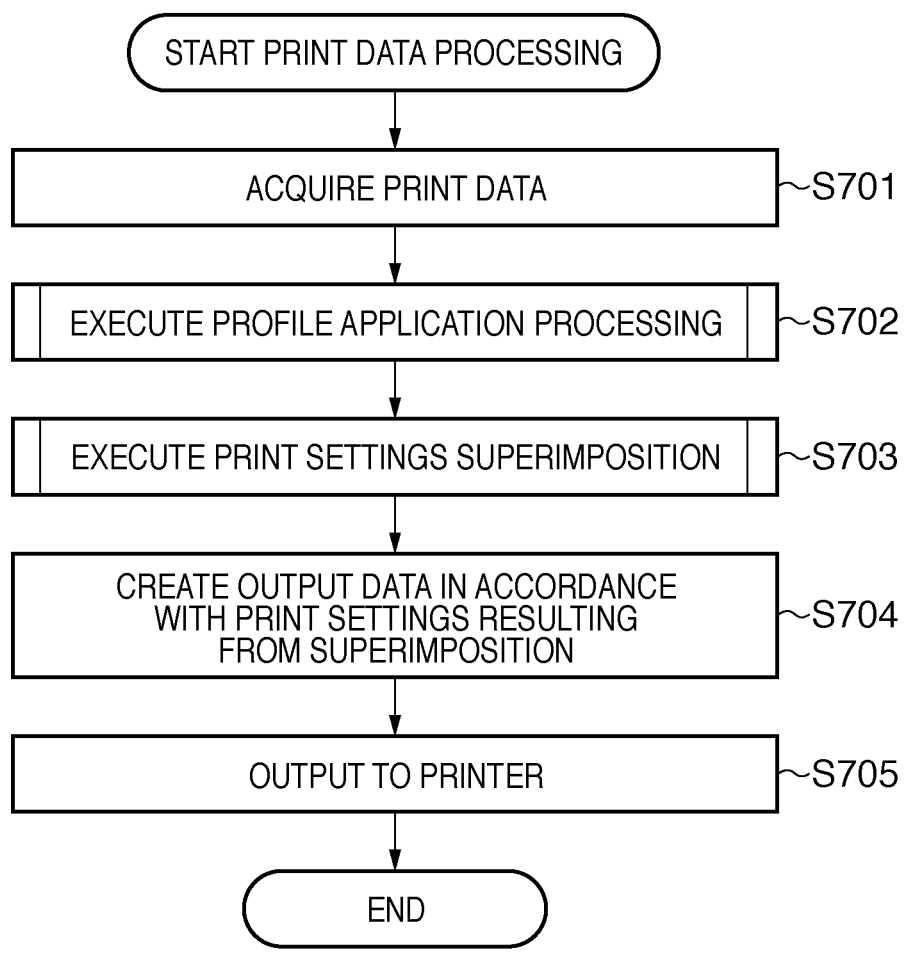
FIG. 7 is a flowchart illustrating print data processing in this embodiment.

Processing in a case where the printer driver 203 has received print data in this embodiment will now be described. FIG. 7 is a flowchart illustrating the processing of print data. First, at step S701, the printer driver 203 acquires the print data (e.g., XPS data). At step S702, processing for applying a profile is executed in accordance with the acquired print data. Next, at step S703, the printer driver 203 superimposes the print settings of the profile selected at step S702, the present print settings in the printer driver and the present print settings included in the print data. The processing of steps S702 and S703 will be described later. In accordance with the superimposed print settings, the printer driver 203 makes a conversion to a control command, such as PDL, that can be recognized by the printer, and creates output data at step S704. This data is output to the printer at step S705.

Figure 8:
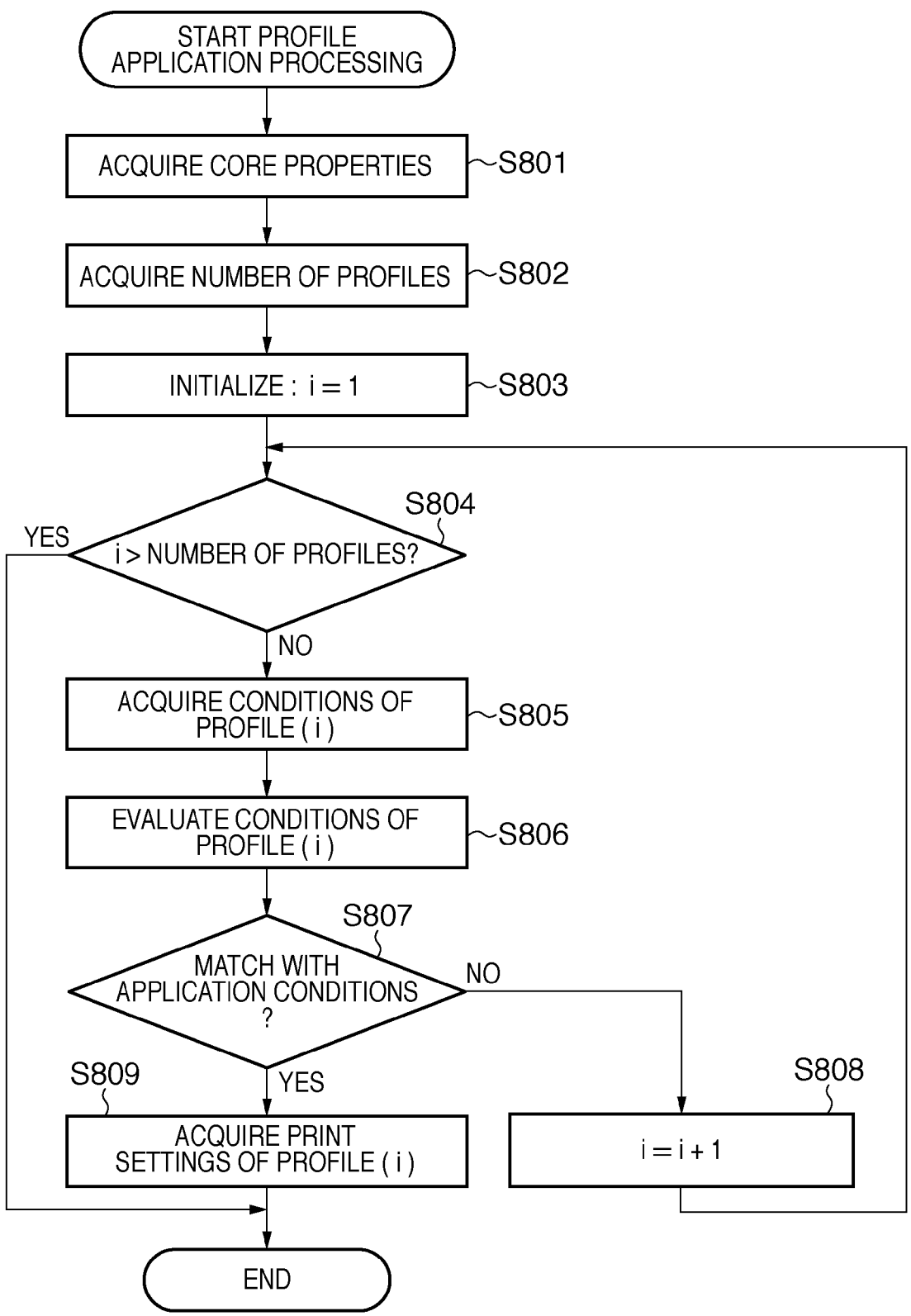
FIG. 8 is a flowchart illustrating the details of profile application processing shown in FIG. 7.

FIG. 8 is a flowchart illustrating the details of the profile application processing shown in FIG. 7. First, at step S801, the printer driver 203 acquires core properties from the print data acquired at step S701. Next, at step S802, the printer driver 203 acquires the number of profiles presently included in the profiles 207. At step S803, the printer driver 203 initializes a counter variable, which has been stored in a storage area of the RAM 2, etc., to "1". Then, at step S804, the printer driver 203 discriminates the size of the value of the counter variable i and the number of profiles acquired at step S802. If it is determined that the value of the counter variable i is greater than the number of profiles, this processing is exited and control proceeds to step S703. On the other hand, if the value of the variable i is equal to or less than the number of profiles, then control proceeds to step S805. Here the printer driver 203 acquires the application conditions of the profile having the ith priority. At step S806, the printer driver 203 refers to the core properties acquired at step S801 and evaluates the application conditions of the profile having the ith priority. Here "evaluate" means to compare the attribute items in order to detect whether the attributes of the core properties match the application conditions of the profile having the ith priority. At step S807, it is determined based upon the result of step S806 whether the application conditions are satisfied. If it is determined that the application conditions are not satisfied, the value of the counter variable i is incremented at step S808 and control returns to step S804. If the application conditions are satisfied, on the other hand, then control proceeds to step S809. Here the print settings of the profile having the ith priority are acquired and this processing is exited. Thus, as a result of processing according to the flowchart of FIG. 8, the printer driver 203 can acquire the print settings of the profile that satisfies the application conditions and that has the highest priority. If this processing is terminated without the existence of a profile that satisfies the application conditions, then the acquired print settings of the profile are not assigned (i.e., the settings are not made).

Figure 9:
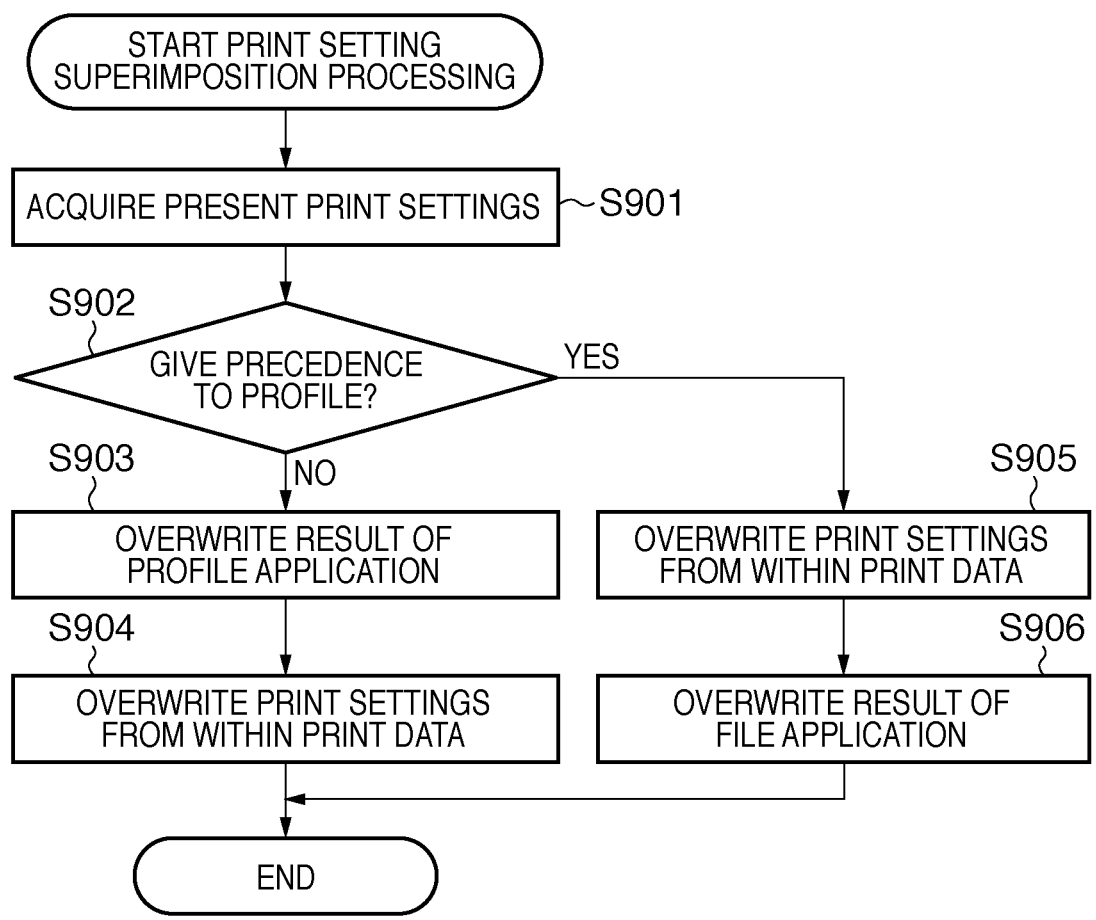
FIG. 9 is a flowchart illustrating the details of processing for superimposing print settings shown in FIG. 8.

FIG. 9 is a flowchart illustrating the details of processing for superimposing print settings shown in FIG. 8. Processing for superimposing print settings involves superimposing the print settings of the profile acquired by the profile application processing, the print settings included in the print data and the present print setting of the printer driver. There are cases where the print settings of the profile and the present print settings included in the print data are unassigned, and there are also cases where only some of the print settings to be designated have been designated as being effective. In this embodiment, the values of the present print settings of the printer driver 203 are used with regard to print settings that have not been designated. In this embodiment, with the present print settings of the printer driver 203 serving as the base, overwriting of these print settings is performed in order of print settings of increasing priority, and the final print settings used at step S705 in FIG. 7 are decided. Here the overwriting of print settings signifies updating print setting values if print setting values of setting items identical with those of the original print settings exist, and adding on print setting items if print setting values of setting items identical with those of the original print settings do not exist. Further, as to which of the print settings of the profile or the print settings of the print data are written over the print settings of the printer driver first, the particular order can be controlled by the user by using the profile priority setting button 407 shown in FIG. 4.

Figure 10:
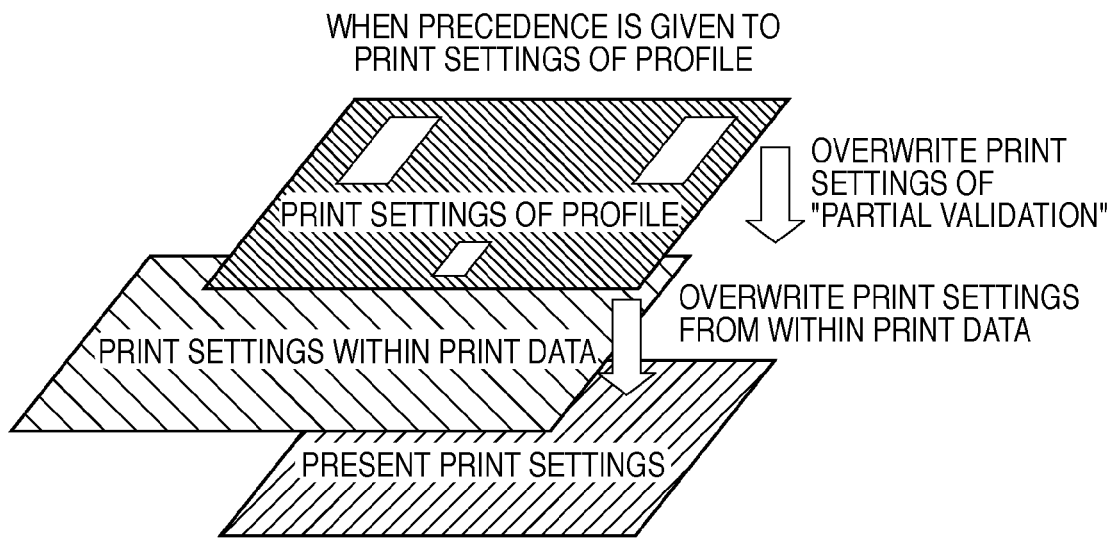
FIG. 10 is a diagram useful in describing a concept in a case where print settings are superimposed upon giving precedence to print settings of a profile.

FIG. 10 is a diagram useful in describing this concept in a case where print settings are superimposed by giving precedence to the print settings of a profile. In a case where the print settings of the profile are given precedence, the print settings included in the print data are written over the present print settings of the printer driver, and then the print settings of the profile are written over the print settings included in the print data. By performing the overwriting of the print settings of the profile after the overwriting of the print settings of the print data, the print settings of the profile are given precedence. Further, the print settings of the profile in FIG. 10 indicate a case where only some of the range of values settable by the printer driver have been enabled.

With reference again to FIG. 9, the present print settings of the printer driver 203 are acquired and adopted as the base of superimposition processing at step S901. At step S902, whether or not the print settings of the profile have been given precedence is determined by the profile priority setting button 407. Here a case where it has been determined that the print settings of the profile have not been given precedence will be considered. In this case, the print settings of the profile acquired as the result of step S702 and the print settings of the print data are written over the present printer-driver print settings, which serve as the base of superimposition, in the order mentioned at steps S903, S904. By performing overwriting in this manner, the print settings included in the print data are given precedence. On the other hand, consider a case where it has been determined at step S902 that the print settings of the profile have been given precedence. In this case, the print settings of the print data and the print settings of the profile, which have been acquired as the result of step S702, are written over the present printer-driver print settings, which serve as the base of superimposition, in the order mentioned at steps S905, S906. By performing overwriting in this manner, the print settings of the profile are given precedence. The processing shown in FIG. 9 is exited when the processing of step S904 or S906 ends.

The characterizing features of this embodiment will now be described. By way of example, consider a system in which printing history, which has been archived as XPS data in a file server, is re-printed. "PRINTING HISTORY" has been set in the XPS data of the printing history as the category (Category) attribute of core properties. Further, "secret", "protected" or unassigned has been set in order of decreasing level of concealment as the content status (ContentStatus). Also included are the print settings at the time of printing, such as 2-in-1 printing or double-sided printing.

The XPS data of the printing history is accepted as is by the printer driver 203 as print data. Here the print settings at the time of printing included in the XPS data are exploited and print settings, namely BOX storage and watermark printing, are appended automatically in accordance with the level of concealment of the content status attribute, thereby enhancing security. In such cases, profiles of the kind shown in FIG. 6 are stored beforehand as the profiles 207 in this embodiment. In this example, the priorities 3 and 4 shown in FIG. 6 are not particularly required. Further, it is assumed that the profile priority setting button 407 shown in FIG. 4 has been turned on by the user.

In such settings, it is assumed that the content status attribute of the XPS data has been set to "secret" in a case where very important "PRINTING HISTORY", such as new-product information or customer information, is re-printed. In such case, the application conditions of the print settings of the "BOX STORAGE" profile of Priority 1 in the profiles 207 agree with the attributes of the XPS data at step S806 in FIG. 8. At step S809, therefore, print settings for which only "BOX STORAGE" has been enabled are acquired (this is based upon the "partial enable" setting already described). Profile precedence is determined at step S902 by the setting of the profile priority setting button 407. Accordingly, the print settings included in the printing history are written over the present printer-driver settings at step S905, and then the print settings of "BOX STORAGE" acquired at step S809 are written over at step S906. As a result of the superimposition processing at step S703, print settings in which BOX storage has been added to the original print settings are obtained and printing is performed based upon the final print settings. In this embodiment, as described above, even if print settings for BOX storage, for example, have not been made in the original printing history of the printer driver, printing is performed upon adding on the BOX storage function automatically in accordance with the attribute values of the core properties of the print data. As a result, the security of the printing system can be enhanced. Further, since the user can change the application conditions readily by the user interface, user friendliness is improved.

Figure 11:
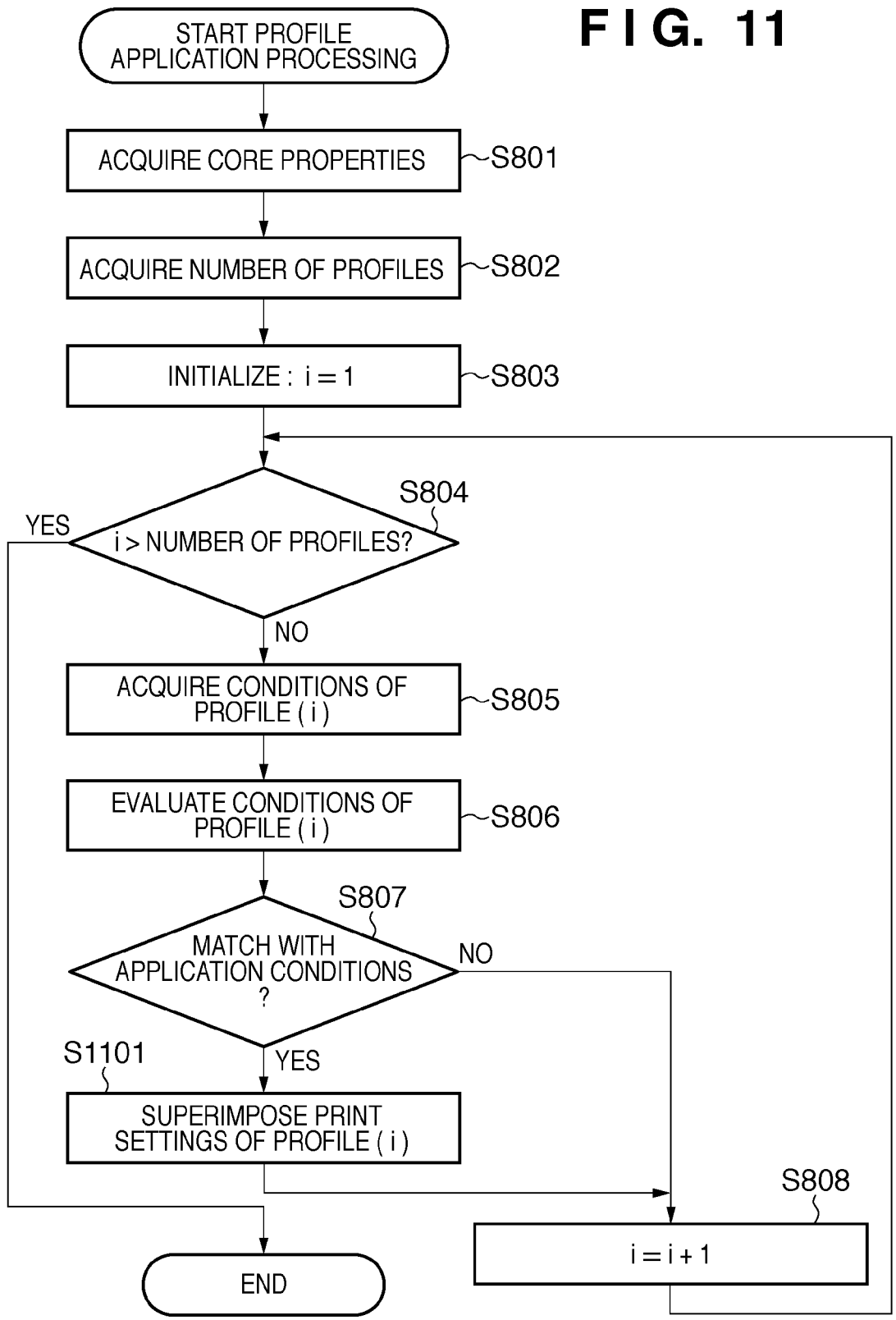
FIG. 11 is a flowchart illustrating the details of profile application processing in a second embodiment of the present invention.
Figure 13:
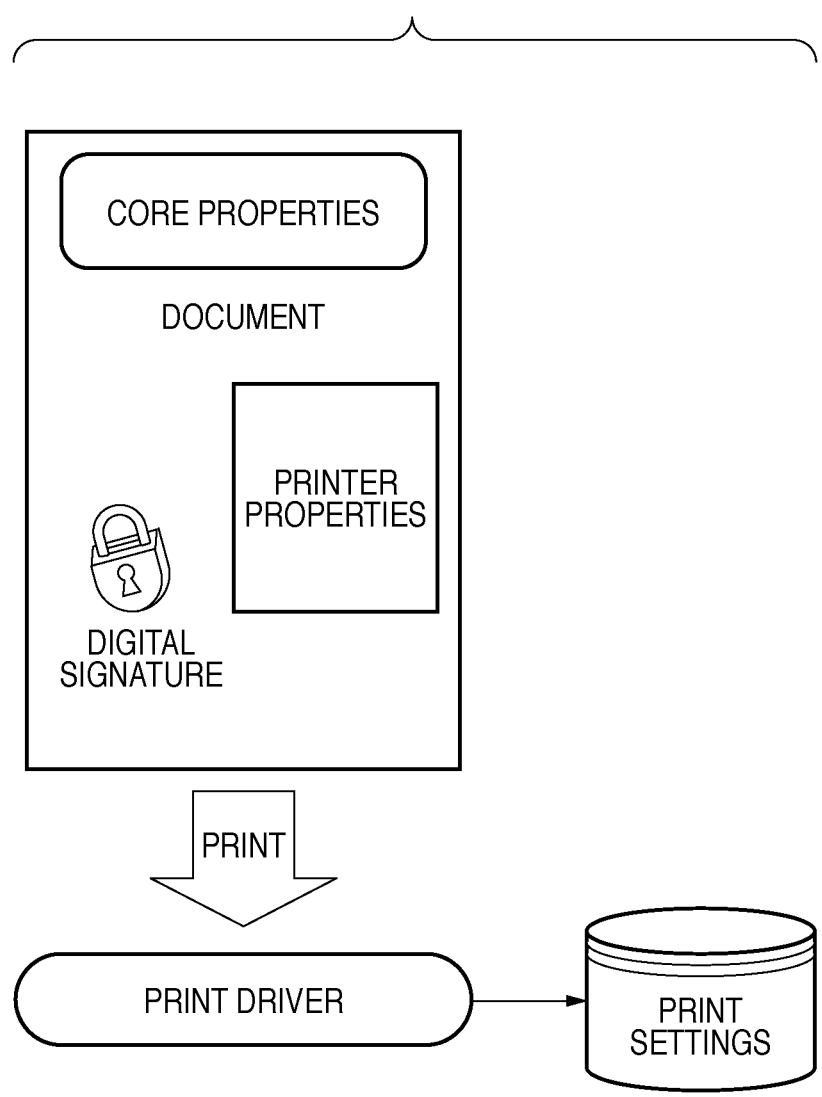
FIG. 13 is a diagram useful in describing an overview of the configuration of document data.

In the first embodiment, one set of print settings of a profile for which the application conditions match in profile application processing and which has the highest priority is acquired. In a second embodiment, on the other hand, processing is executed as illustrated in the flowchart of FIG. 11 and print settings of a plurality of profiles can be applied simultaneously. FIG. 11 is a flowchart illustrating the details of profile application processing in the second embodiment. Portions different from the first embodiment will be described below.

At step S807 shown in FIG. 11, in a case where it has been determined that a match is achieved with the application conditions, as described in FIG. 8, control proceeds to step S1101. Here the print settings of the profile having the ith priority are acquired and these are superimposed on the print settings acquired thus far. In this case, print settings for which the application conditions match and which have a low priority are superimposed one after another. Next, control proceeds to step S808. When the application conditions of all profiles have finished being evaluated, this processing is exited. As a result of the processing according to the flowchart shown in FIG. 11, print settings are obtained which are the result of superimposing, in order from profiles of high priority to profiles of low priority, the print settings of all profiles that match the application conditions. As a result, it is possible to perform printing in which the print settings of a plurality of profiles suited to the print document are applied simultaneously.

The present invention may be applied to a system constituted by a plurality of devices (e.g., a host computer, interface, reader, printer, etc.) or to an apparatus comprising a single device (e.g., a copier or facsimile machine, etc.). Further, the embodiments may be implemented by reading program code from a storage medium, which stores program code for implementing the procedures of the above-described flowcharts, and then executing the program code by a computer (CPU, MPU, etc.) of the system or apparatus. In this case, the program code per se read from the storage medium implements the functions of the embodiments. Accordingly, this program (printing control program) code and the storage medium storing the program code also constitute one aspect of the present invention. Examples of storage media that can be used for supplying the program code are a floppy (registered trademark) disk, hard disk, optical disk, magneto-optical disk, CD-ROM, CD-R, magnetic tape, non-volatile type memory card or ROM, etc. Further, it may be so adapted that an operating system running on the computer executes all or a part of the actual processing based upon commands in the program code read out by the computer so that the functions of the embodiments are implemented by this processing. Further, the program read from the storage medium can be written to a memory provided on a function expansion board inserted into the computer or provided in a function expansion unit connected to the computer. Thereafter, a CPU or the like mounted on the function expansion board or function expansion unit performs all or a part of the actual processing based upon the commands of the program code so that the functions of the foregoing embodiments are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-287854, filed Nov. 5, 2007, which is hereby incorporated by reference herein in its entirety.

What is claimed is:

1. An information processing apparatus comprising:
   a storage unit configured to store correspondence information in which attribute information of print data and a profile which includes a plurality of print settings are associated with each other, wherein the storage unit stores the correspondence information when an instruction to associate the attribute information with the profile is accepted;
   an acquiring unit configured to acquire print data from an application, wherein the print data includes a print setting and attribute information;
   a selecting unit configured to select the profile corresponding to the attribute information of the print data acquired by the acquiring unit;
   wherein, in a case where the plurality of print settings in the selected profile, the print setting of the print data, and a print setting of a printer driver are to be combined with each other,
   a combining unit configured to generate a new print setting by combining the plurality of print settings, the print setting of the print data, and the print setting of the printer driver with each other; and
   a generating unit configured to generate output data based on the new print setting generated by said combining unit;
   wherein if a content of a print setting of the plurality of print settings is the same as a content of the print setting of the print data, the print setting of the plurality of print settings is used in a combining process by the combining unit preferentially over the print setting of the print data, and
   if a content of the print setting of the print data is not the same as a content of any of the plurality of print settings, the print setting of the print data is used in the combining process.

2. The apparatus according to claim 1, wherein said selecting unit selects the profile including a monochrome setting in a case where the attribute information of the print data is a draft version of XPS data, and said selecting unit selects the profile including a color setting in a case where the attribute information of the print data is a final version of XPS data.

3. The apparatus according to claim 1, wherein said combining unit writes the print setting of the print data on the print setting of the printer driver, and then, writes the plurality of print settings on the combined print setting in which the print setting of the print data is written on the print setting of the printer driver.

4. A method of processing information, the method comprising the steps of:
   storing correspondence information in which attribute information of print data and a profile which includes a plurality of print settings are associated with each other, wherein the correspondence information is stored when an instruction to associate the attribute information with the profile is accepted;
   acquiring print data from an application, wherein the print data includes a print setting and attribute information;
   selecting the profile corresponding to the attribute information of the print data acquired by the acquiring step;

in a case where the plurality of print settings in the selected profile, the print setting of the print data and a print setting of a printer driver are to be combined, combining the plurality of print settings, the print setting of the print data, and the print setting of the printer driver with each other, to generate a new print setting; and generating output data based on the new print setting generated by the combining step;

wherein, if a content of a print setting of the plurality of print settings is the same as a content of the print setting of the print data, the print setting of the plurality of print settings is used in a combining process by the combining step preferentially over the print setting of the print data, and if a content of the print setting of the print data is not the same as a content of any of the plurality of print settings, the print setting of the print data is used in the combining process by the combining step, and wherein the storing step, the acquiring step, the selecting step, the combining steps and the generating step are performed, at least in part, by one or more processors.

5. A non-transitory computer-readable storage medium storing a program that, when executed by a computer, causes the computer to perform a method of processing information, the method comprising the steps of:

storing correspondence information in which attribute information of print data and a profile which includes a plurality of print settings are associated with each other, wherein the correspondence information is stored when an instruction to associate the attribute information with the profile is accepted;

acquiring print data from an application, wherein the print data includes a print setting and attribute information;

selecting the profile corresponding to the attribute information of the print data acquired by the acquiring step;

in a case where the plurality of print settings in the selected profile, the print setting of the print data and a print setting of a printer driver are to be combined, combining the plurality of print settings, the print setting of the print data, and the print setting of the printer driver with each other, to generate a new print setting; and generating output data based on the new print setting generated by the combining step;

wherein, if a content of a print setting of the plurality of print settings is the same as a content of the print setting of the print data, the print setting of the plurality of print settings is used in a combining process by the combining step preferentially over the print setting of the print data, and if a content of the print setting of the print data is not the same as a content of any of the plurality of print settings, the print setting of the print data is used in the combining process by the combining step.

6. The apparatus according to claim 1, wherein the storage unit stores a plurality of items of the correspondence information that have respectively priorities, and wherein the selecting unit selects the profile in a higher priority, if the plurality of items of the correspondence information correspond to respectively the same attribute information of the print data.

7. The apparatus according to claim 1, wherein, (a) in a case where the plurality of print settings of the profile are instructed to be used preferentially and the content of the print setting of the plurality of print settings is the same as the content of the print setting of the print data, the print setting of the plurality of print settings is used in the combining process by the combining unit preferentially over the print setting of the print data, wherein the print setting of the plurality of print settings is overwritten to the print setting of the printer driver after the print setting of the print data is overwritten to the print setting of the printer driver, (b) in a case where the plurality of print settings of the profile are not instructed to be used preferentially and the content of the print setting of the plurality of print settings is the same as the content of the print setting of the print data, the print setting of the print data is used in the combining process by the combining unit preferentially over the print setting of the plurality of print settings, wherein the print setting of the plurality of print settings is overwritten to the print setting of the printer driver before the print setting of the print data is overwritten to the print setting of the printer driver.

* * * * *